(12) United States Patent
Endo et al.

(10) Patent No.: US 8,266,450 B2
(45) Date of Patent: Sep. 11, 2012

(54) INFORMATION PROCESSING DEVICE, ENCRYPTION METHOD OF INSTRUCTION CODE, AND DECRYPTION METHOD OF ENCRYPTED INSTRUCTION CODE

(75) Inventors: Takashi Endo, Musashimurayama (JP); Toshio Okochi, Tokyo (JP); Shunsuke Ota, Kokubunji (JP); Tatsuya Kameyama, Hachioji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 721 days.

(21) Appl. No.: 12/417,856

(22) Filed: Apr. 3, 2009

(65) Prior Publication Data

US 2009/0254740 A1 Oct. 8, 2009

(30) Foreign Application Priority Data

Apr. 3, 2008 (JP) ................................. 2008-097139

(51) Int. Cl.
*G06F 11/30* (2006.01)
(52) U.S. Cl. ........ 713/190; 713/189; 380/277; 712/233; 712/226
(58) Field of Classification Search ........................ None
See application file for complete search history.

(56) References Cited

U.S. PATENT DOCUMENTS

| 5,544,244 | A  | * | 8/1996  | Ogura ............................ 713/190 |
| 7,499,541 | B2 | * | 3/2009  | Tanaka et al. ...................... 380/1 |
| 7,623,660 | B1 | * | 11/2009 | Cory ............................. 380/200 |
| 2004/0172547 | A1 | * | 9/2004 | Okamoto et al. ............. 713/190 |
| 2004/0177257 | A1 | * | 9/2004 | Fujinawa et al. ............. 713/189 |
| 2005/0180511 | A1 | * | 8/2005 | Arafune et al. .......... 375/240.28 |

FOREIGN PATENT DOCUMENTS

| JP | 7-129473 | 5/1995 |
| JP | 2005-18434 | 1/2005 |

* cited by examiner

*Primary Examiner* — Fikremariam A Yalew
(74) *Attorney, Agent, or Firm* — Miles & Stockbridge P.C.

(57) ABSTRACT

It is possible to achieve the protection of software with reduced overhead. For example, a memory for storing an encrypted code prepared in advance and a decryptor module for decrypting the code are provided. The decryptor module includes, for example, a three-stage pipeline and a selector for selecting one output from the outputs of each stage of the pipeline. When a branch instruction is issued and subsequent inputs of the pipeline are in the order of CD'1, CD'2, . . . , the decryptor module outputs a first decrypted code by performing a one-stage pipeline process to CD'1. Next, the decryptor module outputs a second decrypted code by performing a two-stage pipeline process to CD'2, and the decryptor module outputs a third decrypted code by performing a three-stage pipeline process to CD'3 (and subsequent codes). Therefore, in particular, the overhead to CD'1 can be reduced.

5 Claims, 10 Drawing Sheets

INFORMATION PROCESSING DEVICE, ENCRYPTION METHOD OF INSTRUCTION CODE, AND DECRYPTION METHOD OF ENCRYPTED INSTRUCTION CODE

CROSS-REFERENCE TO RELATED APPLICATION

The present application claims priority from Japanese Patent Application No. JP 2008-097139 filed on Apr. 3, 2008, the content of which is hereby incorporated by reference into this application.

TECHNICAL FIELD OF THE INVENTION

The present invention relates to an information processing device, an encryption method of an instruction code and a decryption method of an encrypted instruction code, and more particularly to a technique effectively applied to an information processing device which performs a desired process while decrypting an encrypted instruction code previously stored in a memory in real time.

BACKGROUND OF THE INVENTION

For example, Japanese Patent Application Laid-Open Publication No. 7-129473 (Patent Document 1) describes a data protection device which encrypts and stores an execution program of a computer in an external storage device, and executes the program while decrypting the same. In this data protection device, for example, an address space of the external storage device is divided for each four addresses for the encryption. The encrypted data whose low two bits of the address are "11" is created by using the previous encrypted data whose low two bits are "10". Similarly, the encrypted data of "10" and "01" are created by using the encrypted data of "01" and "00", respectively, and the encrypted data of "00" is created by using an initial value. Then, when the data column whose low two bits of the address are "10" is executed in response to a branch instruction, the decryption is sequentially performed from its two-previous encrypted data of "00", and wait is performed until reaching the encrypted data of "10".

Also, Japanese Patent Application Laid-Open Publication No. 2005-18434 (Patent Document 2) describes a microprocessor in which the pipeline process for executing a received encrypted instruction while decrypting the same can be performed with suppressing the generation of stall. Specifically, the two-stage pipeline is provided in the instruction fetch unit, and the instruction fetch is performed on the former stage and the decryption of the encrypted instruction is performed on the latter stage.

SUMMARY OF THE INVENTION

In recent years, the importance of the protection of digital contents typified by game software, video contents and others has been increasing. The protection of these digital contents is ensured by using encryption, signature and various other technologies, but there is a fear that the protection function is disabled when the software (firmware) controlling them is altered. For example, the copyright protection function can be disabled by cryptanalyzing and altering the firmware of a DVD drive, and the checking function of illegal software can be disabled by cryptanalyzing and altering the firmware of a gaming machine, so that the illegal copy of the video contents and the game software becomes possible.

As the protection technology for the firmware described above, for example, a method of storing an obfuscated program in a ROM (Read Only Memory) and a method described in the Patent Document 1, in which an encrypted program is stored in a ROM and the program is decrypted when it is executed, have been known. In the method in which a program is obfuscated, for example, a simple instruction in one row is transformed into an obfuscated instruction in plural rows, thereby making the cryptanalysis from outside difficult, but the overhead at the time of instruction execution is correspondingly increased. Further, it cannot be said that the protection against the falsification and copying is sufficient in this method. Meanwhile, in the method of performing the encryption, it is possible to provide sufficient protection against the cryptanalysis, falsification and copying, but in this case, appropriate cipher strength has to be provided. However, when the cipher strength is increased, the overhead is increased in proportion to the strength in general, and therefore, it is important to ensure compatibility therebetween.

In such a circumstance, in the technology of the Patent Document 1, a relatively high cipher strength is achieved by employing the encryption method in which a next encrypted code is generated by using a previous encrypted code. In this technology, however, when the branch instruction is issued, overheads different in size depending on the values of branch destination addresses thereof are generated, and therefore, there is a possibility that the real-time processing becomes difficult as the number of branch instructions directed to the branch destination addresses with large overhead is increased.

Therefore, an object of the present invention is to provide an information processing device, an encryption method of an instruction code and a decryption method of an encrypted instruction code capable of achieving the protection of software with reduced overhead. Note that the above and other objects and novel characteristics of the present invention will be apparent from the description of this specification and the accompanying drawings.

The typical embodiments of the inventions disclosed in this application will be briefly described as follows.

An information processing device according to one embodiment of the present invention comprises: a memory in which an encrypted code is stored; a decryptor for generating a decrypted code by decrypting the encrypted code; and an instruction execution unit for executing the decrypted code. When the instruction execution unit issues a branch instruction, the decryptor generates a decrypted code by performing a decryption in accordance with a low cipher strength to an encrypted code of the branch destination thereof, and thereafter, it generates a decrypted code by performing a decryption in accordance with a high cipher strength gradually as the instruction execution unit advances the process from the branch destination.

Therefore, although a certain degree of overhead is required until an initial instruction code after the branch instruction is issued is executed when the cipher strength is assumed to be always constant, the overhead can be reduced by using the configuration described above. By this means, the real-time processing can be realized in, for example, the embedded device. Furthermore, since the cipher strength is gradually increased after this initial instruction code, the sufficient cipher strength can be maintained when viewed as the whole instruction code.

Also, the above-described decryptor includes: a multiple-stage pipeline in which a decryption process is performed for each stage by using a key; a selection circuit which selects any one of outputs of each stage of the multiple-stage pipeline and outputs it to an instruction execution unit; and a control circuit which controls the selection circuit while detecting the issuance of the branch instruction by the instruction execution unit. By using the configuration described above, the decrypted code can be generated with the reduced overhead because the cipher strength is reduced by selecting the output passed through a small number of pipeline stages immediately after the issuance of the branch instruction. Thereafter, by gradually increasing the number of stages of the pipeline, the output of which is selected, the high cipher strength can be achieved, and at the same time, the decrypted code can be generated by the pipeline process in a time-efficient manner.

Also, in an encryption method of an instruction code according to one embodiment of the present invention, a previously prepared source code is transformed by using a program process by a computer system, thereby generating an encrypted code. At this time, the computer system first determines whether or not each source code assigned to each address is a branch instruction, and recognizes the branch destination address thereof. Subsequently, the computer system transforms the source code of the branch destination address by using a first encryption algorithm, thereby generating a first encrypted code, and further transforms the source code of the next address of the branch destination address by using a second encryption algorithm, thereby generating a second encrypted code. The second encryption algorithm mentioned here has a higher cipher strength than the first encryption algorithm. The encrypted code is generated by using such an encryption method and is stored in a memory of the above-described information processing device, so that the above-described effects can be achieved.

The effects obtained by typical embodiments of the inventions disclosed in this application will be briefly described below. That is, it becomes possible to protect the software with reduced overhead.

BRIEF DESCRIPTIONS OF THE DRAWINGS

DESCRIPTIONS OF THE PREFERRED EMBODIMENTS

In the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

Hereinafter, embodiments of the present invention will be described in detail with reference to the accompanying drawings. Note that components having the same function are denoted by the same reference numbers throughout the drawings for describing the embodiments, and the repetitive description thereof will be omitted.

Figure 1:
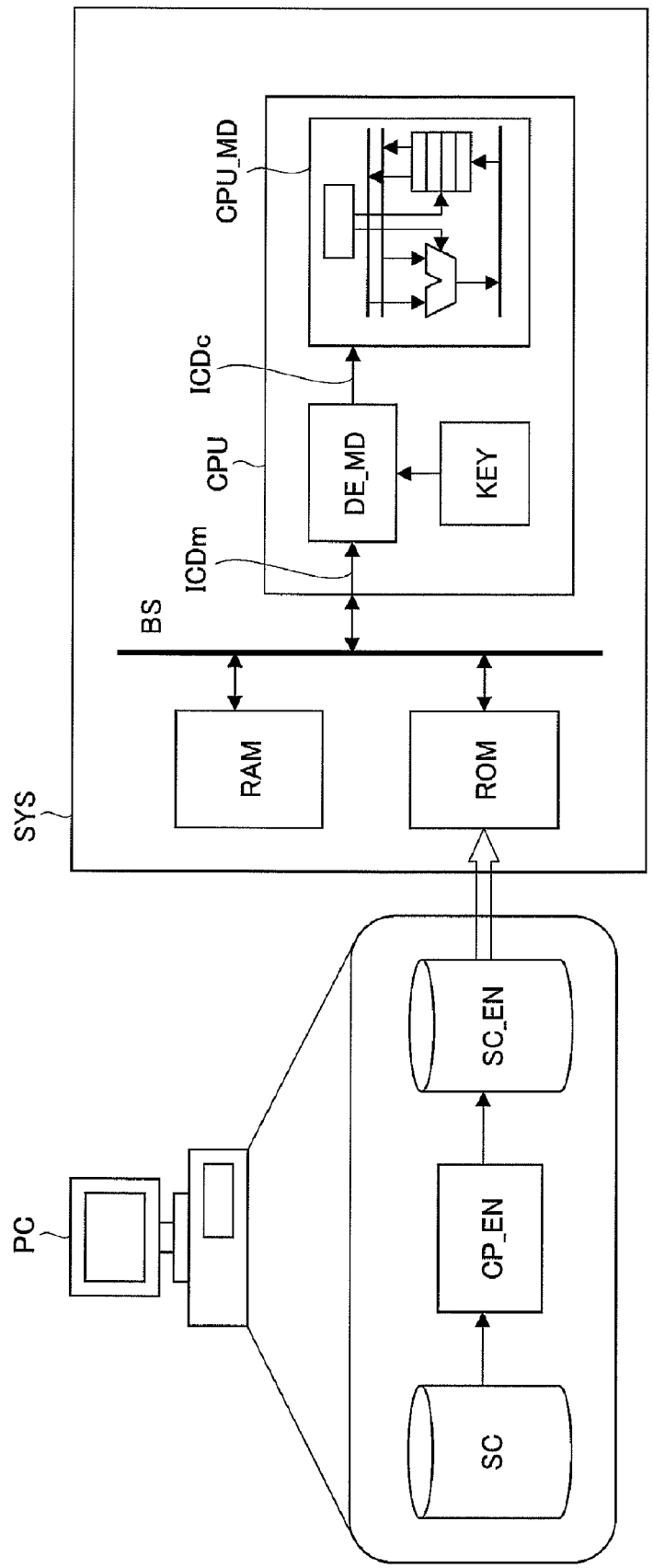
FIG. 1 is a block diagram showing one example of the general configuration of an information processing device according to one embodiment of the present invention.

FIG. 1 is a block diagram showing one example of the general configuration of an information processing device according to one embodiment of the present invention. An information processing device SYS of FIG. 1 is, for example, an information processing unit provided in a so-called embedded device typified by DVD equipment, a gaming machine, a mobile phone and others. This information processing device SYS includes a bus BS, a volatile memory (RAM: Random Access Memory), a non-volatile memory (ROM) and a processor (CPU: Central Processing Unit) mutually connected by the bus BS. The ROM is typically a flash memory, EEPROM (Electrically Erasable and Programmable Read Only Memory) or the like.

A program for controlling the embedded device (that is, firmware) is stored in the ROM. This firmware is encrypted in advance by using an external device PC typified by a personal computer and then stored. More specifically, the external device PC performs the encryption to a source code SC by using an encryption compiler CP_EN to be software and stores the encrypted source code SC_EN thus generated in the ROM.

The CPU includes a decryptor module DE_MD, a secret key KEY and a processor module CPU_MD. Although described later in detail, the decryptor module DE_MD receives a memory output code ICDm which is an encrypted code stored in the ROM, decrypts the same by using the secret key KEY and outputs the resulting decrypted code to the CPU_MD as a CPU instruction code ICDc. The CPU_MD performs the predetermined processes by fetching, decoding and executing the decrypted CPU instruction code ICDc (that is, equivalent to the source code SC) similarly to the general processor. The secret key KEY is set in advance in the CPU by using, for example, a hardware circuit, a non-volatile memory and others.

Figure 2:
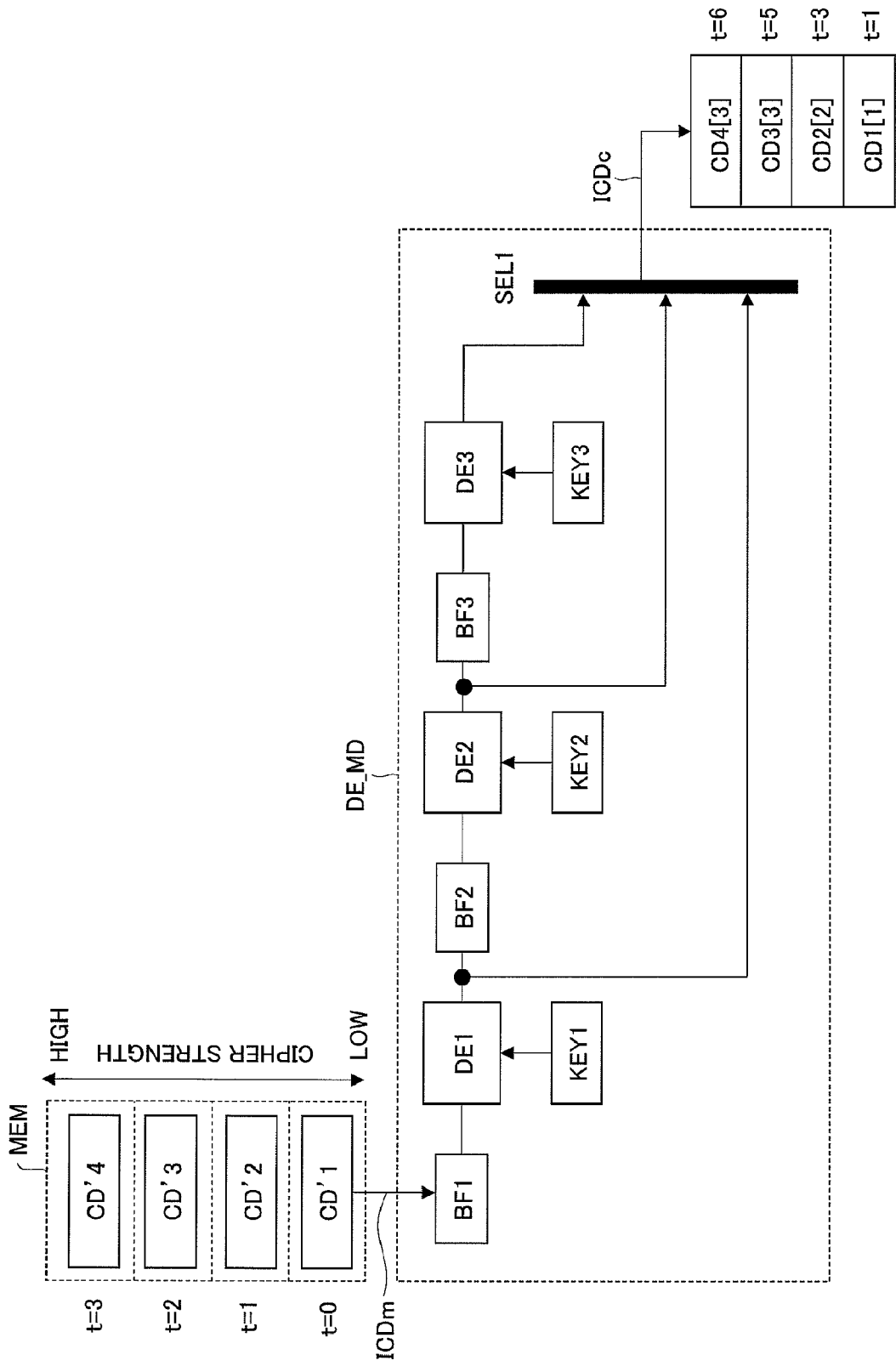
FIG. 2 is a conceptual diagram showing a schematic configuration example and an operation example of a decryptor module in the information processing device of FIG. 1.

FIG. 2 is a conceptual diagram showing a schematic configuration example and an operation example of the decryptor module DE_MD in the information processing device of FIG. 1. As shown in FIG. 2, the decryptor module DE_MD is constituted of buffers BF1 to BF3, decryptor circuits DE1 to DE3, secret keys KEY1 to KEY3, a selector SEL1 and others.

The DE1 decrypts an output of the BF1 by using the KEY1 and then transmits it to the BF2, and the DE2 decrypts an output of the BF2 by using the KEY2 and transmits it to the BF3. The DE3 decrypts an output of the BF3 by using the KEY3. The selector SEL1 selects and outputs any one of the outputs of the DE1, DE2 and DE3.

As described above, the DE_MD is mainly characterized by including a multiple-stage (here, three-stage) pipeline and the selector SEL1 for selecting the outputs of each stage of the pipeline. In such a case, the cipher strength is increased as passing through the stages of the pipeline (in other words, as going from DE1 to DE3), but the overhead until taking the initial output immediately after the issuance of the branch instruction is correspondingly increased. Therefore, the selector SEL1 capable of taking out the outputs with different cipher strengths is provided, thereby reducing the overhead.

More specifically, a case is assumed in which an encrypted code CD'1 is inputted at a cycle t=0 as the memory output code ICDm from the memory MEM (for example, corresponding to ROM of FIG. 1) immediately after the issuance of the branch instruction, and then, encrypted codes CD'2, CD'3 and CD'4 are sequentially inputted at cycles t=1, t=2 and t=3. These encrypted codes CD'1 to CD'4 are sequentially inputted in the buffer BF1 and processed in the pipeline.

Here, for the CD'1 to be the first input code, the DE_MD outputs the decrypted code CD1[1] by the selector SEL1 after the decryption through the first-stage pipeline (decryptor circuit DE1). Next, for the CD'2 to be the second input code, the DE_MD outputs the decrypted code CD2[2] by the SEL1 after the decryption through the second-stage pipeline (decryptor circuits DE1 and DE2). Thereafter, for the CD'3 and CD'4 to be the third and subsequent input codes, the DE_MD outputs the decrypted codes CD3[3] and CD4[4] by the SEL1 after the decryption through the third-stage pipeline (decryptor circuits DE1 to DE3). Note that [k] of CDn[k] indicates the number of stages (cipher strength) of the pipeline.

By using the operation as described above, the CD1[1] is outputted at t=1, the CD2[2] is outputted at t=3, and the CD3[3] and CD4[3] are outputted at t=5 and t=6, respectively. Meanwhile, if the cipher strength is not changed, the CD1[3] is outputted at t=3, and CD2[3] to CD4[3] are sequentially outputted at t=4 to t=6. Therefore, for the first and second input codes (CD'1 and CD'2), the overhead can be reduced by reducing the cipher strength, and for the third and subsequent input codes (CD'3 and CD'4), the cipher strength can be increased without particular overhead along with the pipeline process. Accordingly, when viewed as a whole, the high cipher strength can be achieved with reduced overhead.

Of course, the number of stages of the pipeline is not limited to three stages, and any number of stages can be used as long as the number is two or more. For example, when the number of stages is four, the CD1[1] is outputted at t=1, the CD2[2] is outputted at t=3, the CD3[3] is outputted at t=5, the CD4[4] is outputted at t=7, and subsequent CD5[4], CD6[4], . . . are outputted at t=8, t=9, . . . . In this case, the overhead caused by the decryption of the CD'1 to CD'3 can be reduced. As described above, the number of codes, the overhead of which can be reduced is increased as the number of stages of the pipeline is increased. Therefore, the effect of the present embodiment becomes more conspicuous. Furthermore, also in the case of the program that returns after executing a small number of instruction codes immediately after the issuance of the branch instruction, the above-described effect becomes more conspicuous.

Figure 3:
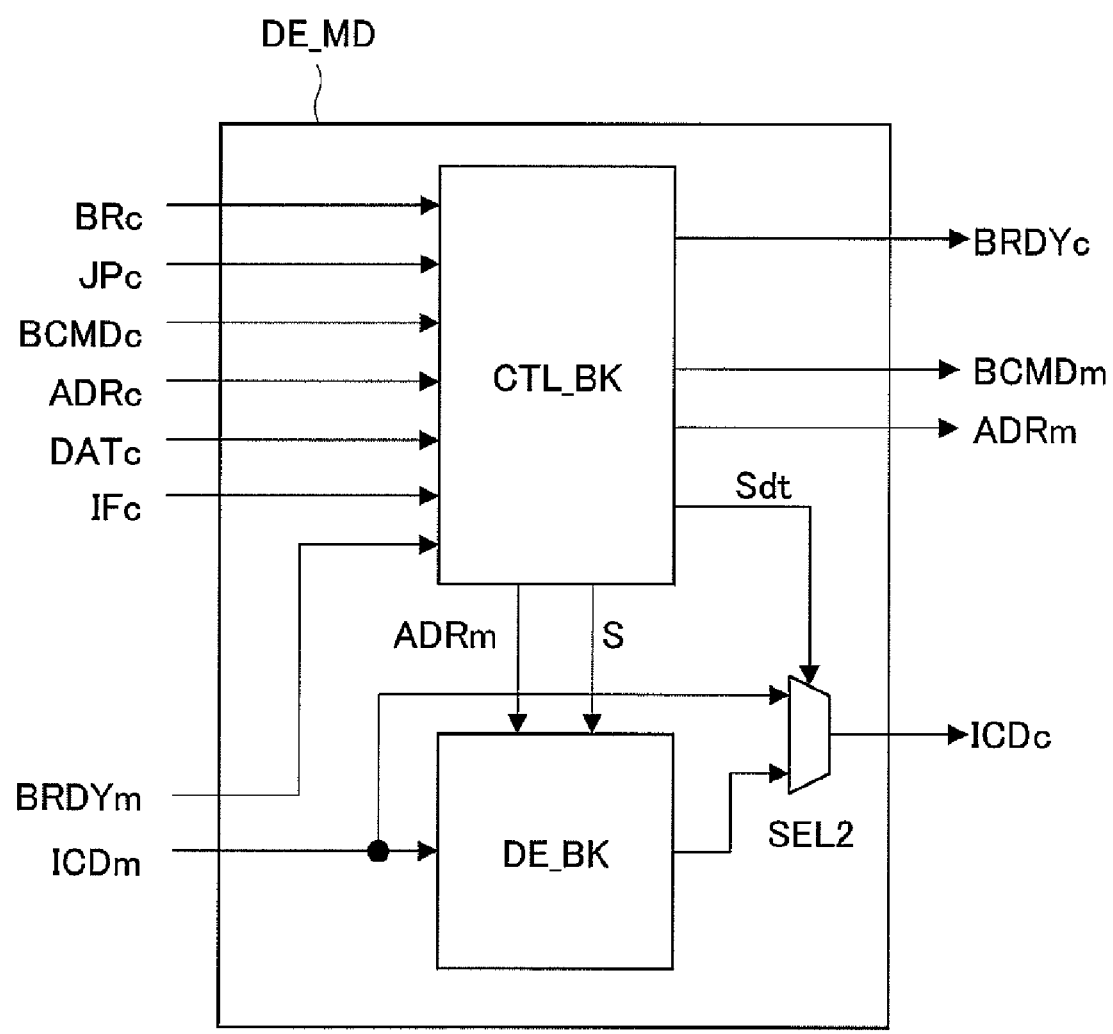
FIG. 3 is a block diagram showing a detailed configuration example of the decryptor module in the information processing device of FIG. 1.

FIG. 3 is a block diagram showing a detailed configuration example of the decryptor module DE_MD in the information processing device of FIG. 1. The decryptor module DE_MD of FIG. 3 includes a cipher strength control block CTL_BK, a decryptor block DE_BK and a selector SEL2. The cipher strength control block CTL_BK receives a conditional branch generating signal BRc, an unconditional branch generating signal JPc, a bus command signal BCMDc, an address signal ADRc, a data signal DATc, an instruction fetch signal IFc and others as input signals from the processor module CPU_MD. The BRc and JPc are outputted by the CPU_MD when the branch is executed during the program execution of the CPU_MD. The BCMDc, ADRc and DATc correspond to access signals directed to the memory. The IFc is not outputted at the time of the data access to the memory but outputted at the time of the instruction code access. Note that, in the case of the instruction code access, the memory corresponds to the ROM of FIG. 1 or corresponds to the RAM of FIG. 1 when the instruction code is expanded in the RAM for use.

The CTL_BK receives these input signals from the CPU_MD and issues a bus command signal BCMDm and the address signal ADRm corresponding to the BCMDc and ADRc to the memory in the case of the instruction code access, thereby performing the instruction code access. The memory receives the BCMDm and ADRm and outputs a memory output code (that is, encrypted code) ICDm and a bus ready signal BRDYm. This memory output code (encrypted code) ICDm is inputted to the decryptor block DE_BK, and the bus ready signal BRDYm is inputted to the CTL_BK. Note that the bus ready signal BRDYm is a signal generated at its corresponding cycle each time when the memory output code ICDm is read from the memory.

The decryptor block DE_BK decrypts the ICDm and then outputs it to one input of the selector SEL2. At the time of this decryption, the CTL_BK outputs a select signal S for controlling the cipher strength (the number of stages of pipeline) as described in FIG. 2 and the address signal ADRm used as a part of the decryption key to the DE_BK. Further, the ICDm is transmitted to the other input of the selector SEL2 directly without passing through the DE_BK. The CTL_BK uses the conditional branch generating signal BRc, the unconditional branch generating signal JPc and the bus ready signal BRDYm when controlling the cipher strength by using the select signal S. More specifically, upon reception of the BRc and JPc, the CTL_BK reduces the cipher strength of the instruction code read immediately thereafter from the memory, and then increases the cipher strength each time when receiving the BRDYm.

Also, the CTL_BK controls the selector SEL2 with the select signal Sdt, and outputs the bus ready signal BRDYc at each cycle when the CPU instruction code (that is, decrypted code) ICDc is inputted from the decryptor block DE_BK through the SEL2. The processor module CPU_MD receives the CPU instruction code ICDc and the bus ready signal BRDYc to perform the predetermined process. Note that the SEL2 is provided so as to handle the cycle where the decryption is not involved (for example, data access to a memory).

Figure 4:
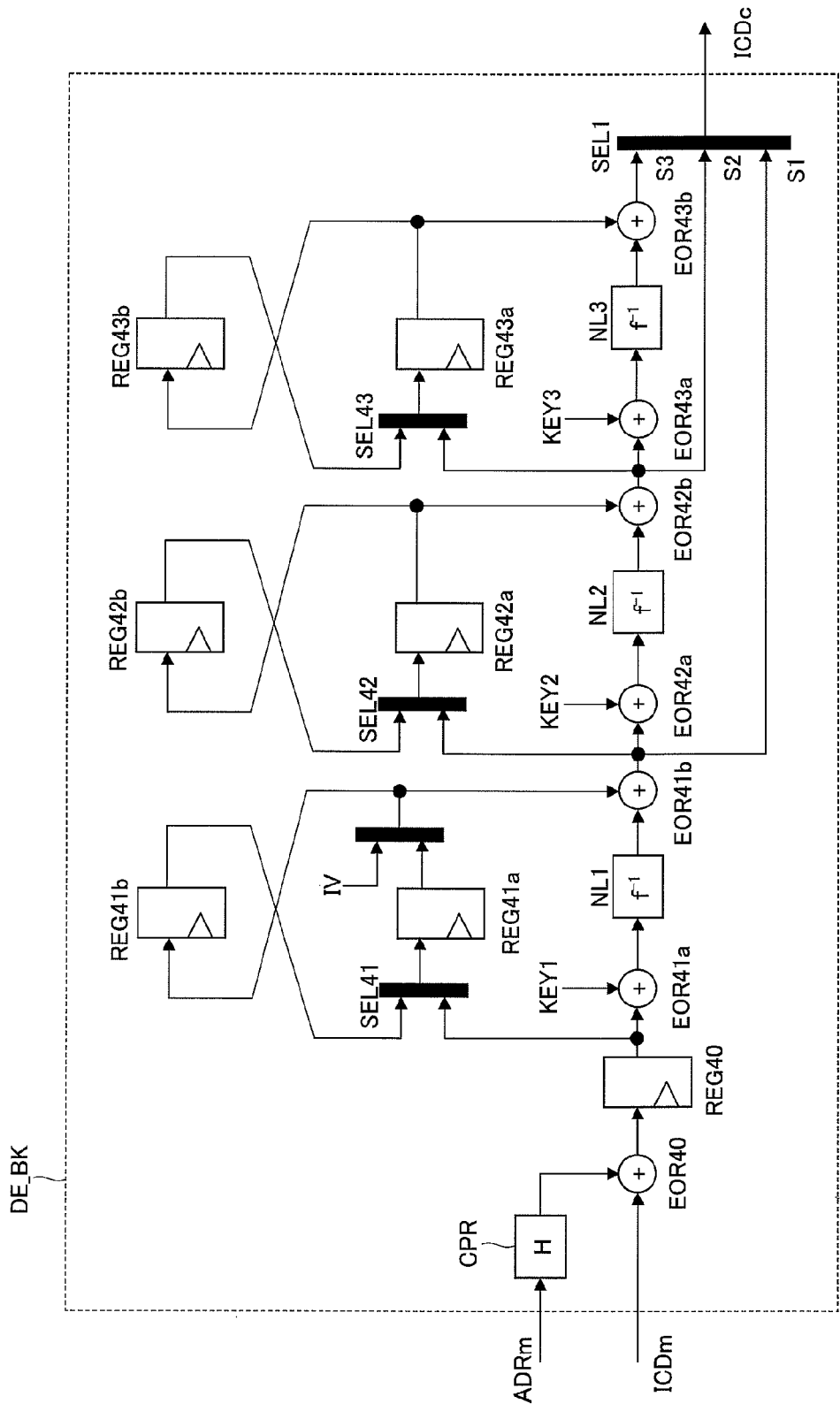
FIG. 4 is a circuit diagram showing a detailed configuration example of a decryptor block in the decryptor module of FIG. 3.

FIG. 4 is a circuit diagram showing a detailed configuration example of the decryptor block DE_BK in the decryptor module DE_MD of FIG. 3. The decryptor block DE_BK of FIG. 4 is constituted of registers REG40, REG41a to REG43a and REG41b to REG43b, exclusive OR (EXOR) circuits EOR40, EOR41a to EOR43a and EOR41b to EOR43b, non-linear transform circuits NL1 to NL3, selectors SEL1 and SEL41 to SEL44 and others.

The EOR40 executes the EXOR operation of the memory output code ICDm and the address signal ADRm at which the code is stored. This operation is a part of the decryption algorithm (encryption algorithm). Note that, although the input to the EOR40 is made from the ADRm through a compression circuit CPR in this case, since this compression circuit CPR is provided so as to equalize the bit widths of the ADRm and the ICDm, it is not particularly necessary when the bit widths are equal from the beginning. The REG40 is a circuit for the encrypted code fetch and latches the operation result of the EOR40.

The first-stage decryption is performed when the output of the REG40 passes through the process of the EOR41$a$, the NL1 and the EOR41$b$. The EOR41$a$ executes the EXOR operation of the output of the REG40 and the secret key KEY1, the NL1 performs the nonlinear transform of the EXOR operation result, and the EOR41$b$ executes the EXOR operation of the nonlinear transform result and the code of the previous cycle stored in the REG41$a$. Although not particularly limited, for example, the method of transforming a certain bit column into another bit column by using a table or the like is known as the NL1. The output of the REG40 is transmitted to the REG41$a$ through one input of the SEL41. Also, the output of the REG41$a$ is transmitted to the EOR41$b$ through one input of the SEL44.

The second-stage decryption is performed when the output of the EOR41$b$ which is the result of the first-stage decryption process passes through the process of the EOR42$a$, the NL2 and the EOR42$b$. The EOR42$a$ executes the EXOR operation of the output of the EOR41$b$ and the secret key KEY2, the NL2 performs the nonlinear transform of the EXOR operation result, and the EOR42$b$ executes the EXOR operation of the nonlinear transform result and the code of the previous cycle stored in the REG42$a$. The output of the EOR41$b$ is transmitted to the REG42$a$ through one input of the SEL42. Also, the output of the REG42$a$ is transmitted to the EOR42$b$.

The third-stage decryption is performed when the output of the EOR42$b$ which is the result of the second-stage decryption process passes through the process of the EOR43$a$, the NL3 and the EOR43$b$. The EOR43$a$ executes the EXOR operation of the output of the EOR42$b$ and the secret key KEY3, the NL3 performs the nonlinear transform of the EXOR operation result, and the EOR43$b$ executes the EXOR operation of the nonlinear transform result and the code of the previous cycle stored in the REG43$a$. The output of the EOR42$b$ is transmitted to the REG43$a$ through one input of the SEL43. Also, the output of the REG43$a$ is transmitted to the EOR43$b$.

The SEL1 selects any one of the first-stage decryption process result (output of the EOR41$b$), the second-stage decryption process result (output of the EOR42$b$) and the third-stage decryption process result (output of the EOR43$b$), and outputs it as the CPU instruction code ICDc. The output of the EOR41$b$ is selected when the select signal S1 is inputted, the output of the EOR42$b$ is selected when the select signal S2 is inputted, and the output of the EOR43$b$ is selected when the select signal S3 is inputted. Note that the other input of the SEL44 is an initial value IV, and the initial value IV is used in place of the code of the previous cycle when performing the first-stage decryption process for the initial instruction code immediately after the issuance of the branch instruction.

Also, the REG41$b$ to the REG43$b$ are used as save registers when an interrupt instruction is generated in the course of the decryption process. More specifically, when an interrupt instruction is issued, the REG41$b$ latches the output of the REG41$a$ (output of the SEL44), the REG42$b$ latches the output of the REG42$a$, and the REG43$b$ latches the output of the REG43$a$. On the other hand, when returning from the interrupt instruction, the output of the REG41$b$ is returned to the REG41$a$ through the other input of the SEL41, the output of the REG42$b$ is returned to the REG42$a$ through the other input of the SEL42, and the output of the REG43$b$ is returned to the REG43$a$ through the other input of the SEL43.

Figure 5:
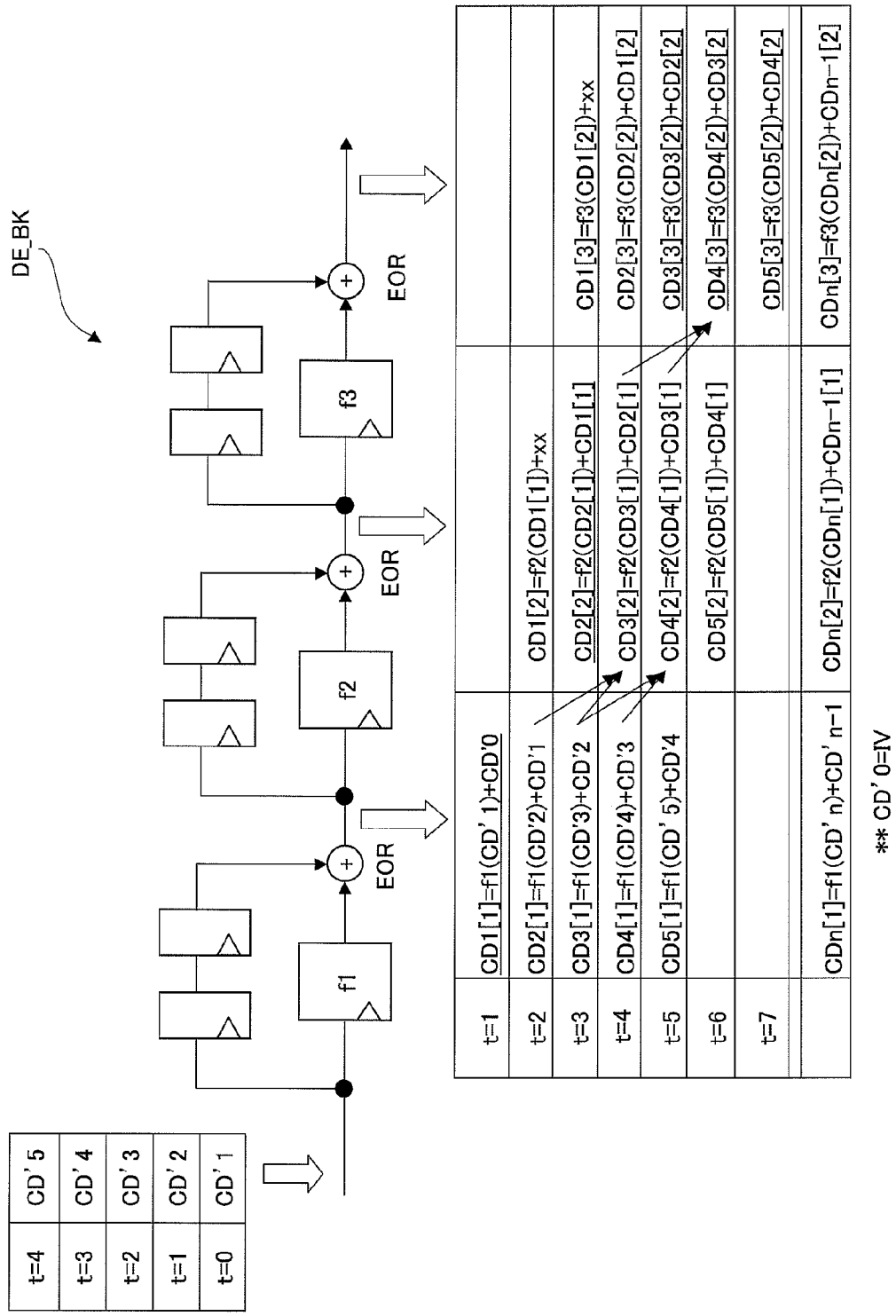
FIG. 5 is an explanatory diagram showing an operation example of the decryptor block of FIG. 4.

FIG. 5 is an explanatory diagram showing an operation example of the decryptor block DE_BK of FIG. 4. In FIG. 5, f1 denotes the EXOR operation by the KEY1 of FIG. 4 and the following nonlinear operation by the NL1. Similarly, f2 denotes the EXOR operation by the KEY2 and the nonlinear operation by the NL2, and f3 denotes the EXOR operation by the KEY3 and the nonlinear operation by the NL3. A case is assumed in which the encrypted code CD'1 is inputted at the cycle t=0, CD'2 is inputted at the cycle t=1, . . . , and CD'7 is inputted at the cycle t=6 as the output of the REG40 of FIG. 4.

In this case, as the first-stage decryption process result, the decrypted code "CD1[1]=f1(CD'1)+CD'0" (here, CD'0=IV) is outputted at t=1, the decrypted code "CD2[1]=f1(CD'2)+CD'1" is outputted at t=2, and subsequently the decrypted codes given by the formula (1) are outputted in the same manner.

$$CDn[1]=f1(CD'n)+CD'n-1 \qquad (1)$$

Also, in parallel to these processes, the second-stage decryption process is performed in the pipeline. As the result of the second-stage decryption process, the decrypted code "CD1[2]=f2(CD1[1])+xx" (here, xx=indefinite) is outputted at t=2, the decrypted code "CD2[2]=f2(CD2[1])+CD1[1]" is outputted at t=3, and subsequently the decrypted codes given by the formula (2) are outputted in the same manner.

$$CDn[2]=f2(CDn[1])+CDn-1[1] \qquad (2)$$

Further, in parallel to these processes, the third-stage decryption process is performed in the pipeline. As the result of the third-stage decryption process, the decrypted code "CD1[3]=f3(CD1[2])+xx" (here, xx=indefinite) is outputted at t=3, the decrypted code "CD2[3]=f3(CD2[2])+CD1[2]" is outputted at t=4, and subsequently the decrypted codes given by the formula (3) are outputted in the same manner.

$$CDn[3]=f3(CDn[2])+CDn-1[2] \qquad (3)$$

Therefore, for obtaining the decrypted code CD4[3] at t=6, for example, the CD4[2] and the CD3[2] at the previous cycle (t=5) and the two-previous cycle (t=4) are necessary in addition to f3. Further, for obtaining the decrypted code CD3[2] at t=4, for example, the CD3[1] and the CD2[1] at the previous cycle (t=3) and the two-previous cycle (t=2) are necessary in addition to f2. Still further, for obtaining the decrypted code CD2[1] at t=2, for example, the CD'2 and the CD'1 are necessary in addition to f1. As described above, since the f1 to f3 and CD'1 to CD'4 are accordingly necessary for obtaining the CD4[3], the high cipher strength can be realized. Also, when the decrypted code CD'1 is the initial instruction code immediately after the branch instruction in FIG. 5, as the CPU instruction code ICDc, the CD1[1] is obtained at t=1, the CD2[2] is obtained at t=3, the CD3[3] is obtained at t=5, the CD4[3] is obtained at t=6 and the CD5[3] is obtained at t=7 by the selector SEL1 of FIG. 4.

Figure 6:
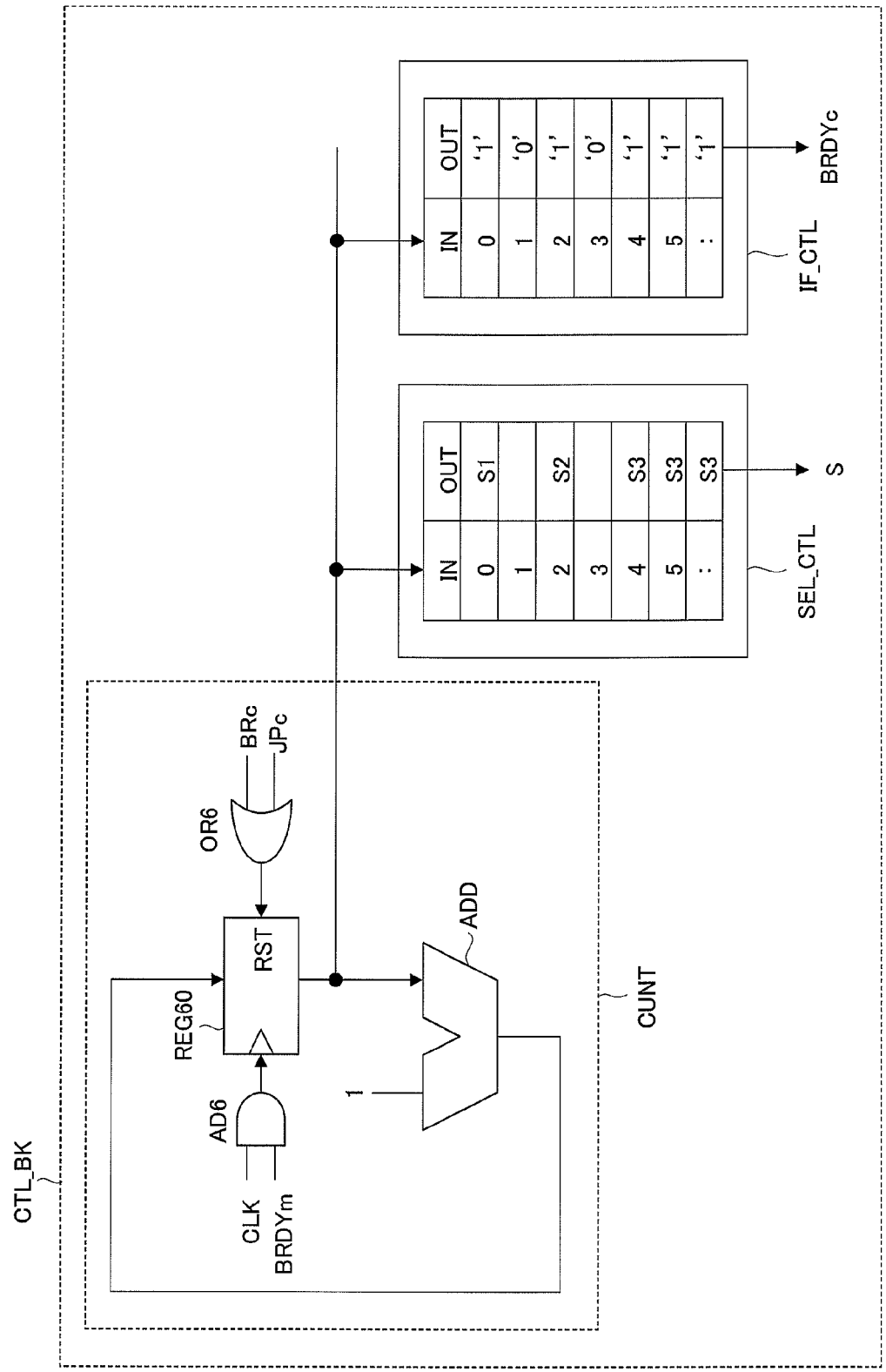
FIG. 6 is a block diagram showing a configuration example of a main part of a cipher strength control block in the decryptor module of FIG. 3.

FIG. 6 is a block diagram showing a configuration example of a main part of the cipher strength control block CTL_BK in the decryptor module DE_MD of FIG. 3. The cipher strength control block CTL_BK of FIG. 6 is provided with a counter unit CUNT, a select signal control unit SEL_CTL, a processor instruction fetch control unit IF_CTL and others. These can be realized by, for example, state machines and others. Upon reception of the logical OR (OR6) output of the conditional branch generating signal BRc and the unconditional branch generating signal JPc from the processor module CPU_MD, the counter unit CUNT resets (RST) the value of a register REG60. Then, upon reception of the logical AND (AD6) output of the clock signal CLK and the bus ready signal BRDYm, the counter unit CUNT adds "1" to the value of the REG60 through an adder circuit ADD at each cycle where the BRDYm is inputted (that is, at each cycle where the encrypted code reaches from the memory).

The select signal control unit SEL_CTL outputs the select signals S1, S2 and S3 when the counter value of the REG60 is "0", "2" and "4", respectively, and outputs the select signal S3 when the counter value of the REG60 is "5", "6", and subsequent values. The processor instruction fetch control unit IF_CTL outputs "1" as the bus ready signal BRDYc when the counter value of the REG60 is "0", "2" and "4", and outputs "1" also when the counter value of the REG60 is "5", "6", and subsequent values. Further, the IF_CTL outputs "0" as the BRDYc when the counter value is "1" or "3".

Figure 7:
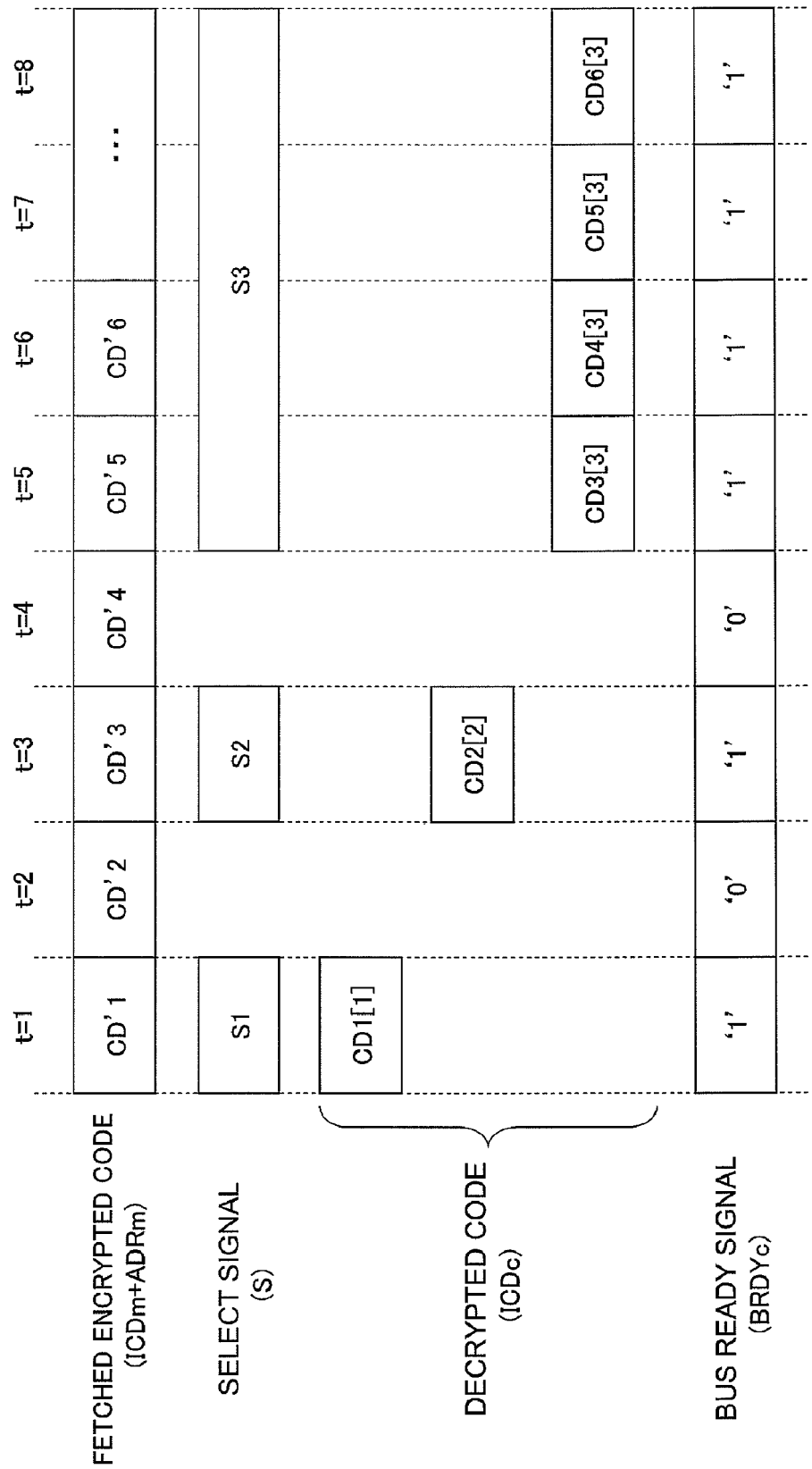
FIG. 7 is a sequence diagram showing an operation example in the case where the configuration examples of FIG. 4 and FIG. 6 are used in the decryptor module of FIG. 3.

FIG. 7 is a sequence diagram showing an operation example in the case where the configuration examples of FIG. 4 and FIG. 6 are used in the decryptor module DE_MD of FIG. 3. In FIG. 7, a case is assumed in which the fetch encrypted code (output of the FF40 of FIG. 4) is CD'1, CD'2, CD'3, . . . at the cycles t=1, t=2, t=3, . . . , respectively. At the cycle t=1, the select signal S1 and the bus ready signal BRDYc='1' are outputted from the cipher strength control block CTL_BK, and the decryptor block DE_BK outputs the decrypted code CD1[1] corresponding to the CD'1 in response to the select signal S1. At the cycle t=3, the select signal S2 and the BRDYc='1' are outputted by the CTL_BK, and the DE_BK outputs the decrypted code CD2[2] corresponding to the CD'2 in response to the S2.

At the cycle t=5, the select signal S3 and the BRDYc='1' are outputted by the CTL_BK, and the DE_BK outputs the decrypted code CD3[3] corresponding to the CD'3 in response to the S3. At the cycle t=6 and subsequent cycles, the select signal S3 and the BRDYc='1' are outputted by the CTL_BK at each of successive cycles, and the DE_BK sequentially outputs the decrypted codes CD4[3], CD5[3], . . . corresponding to the CD'4, CD'5, . . . at each cycle. The processor module CPU_MD performs the predetermined processes by fetching the decrypted code of the cycle of the BRDYc='1' (that is, equivalent to the source code).

Figure 8:
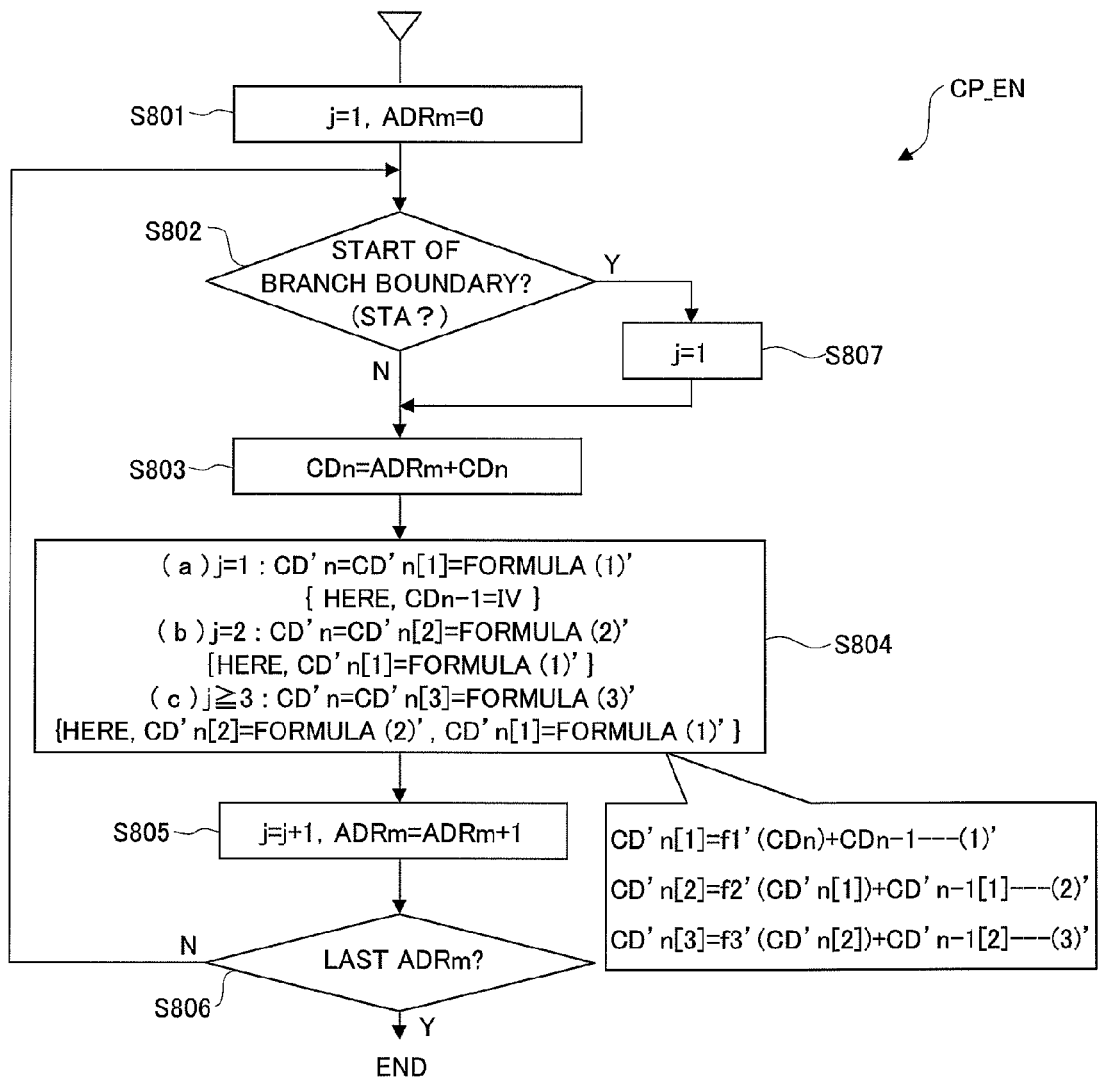
FIG. 8 is a flow diagram showing an operation example of an encryption compiler used when generating the encrypted code in the information processing device of FIG. 1.
Figure 9:
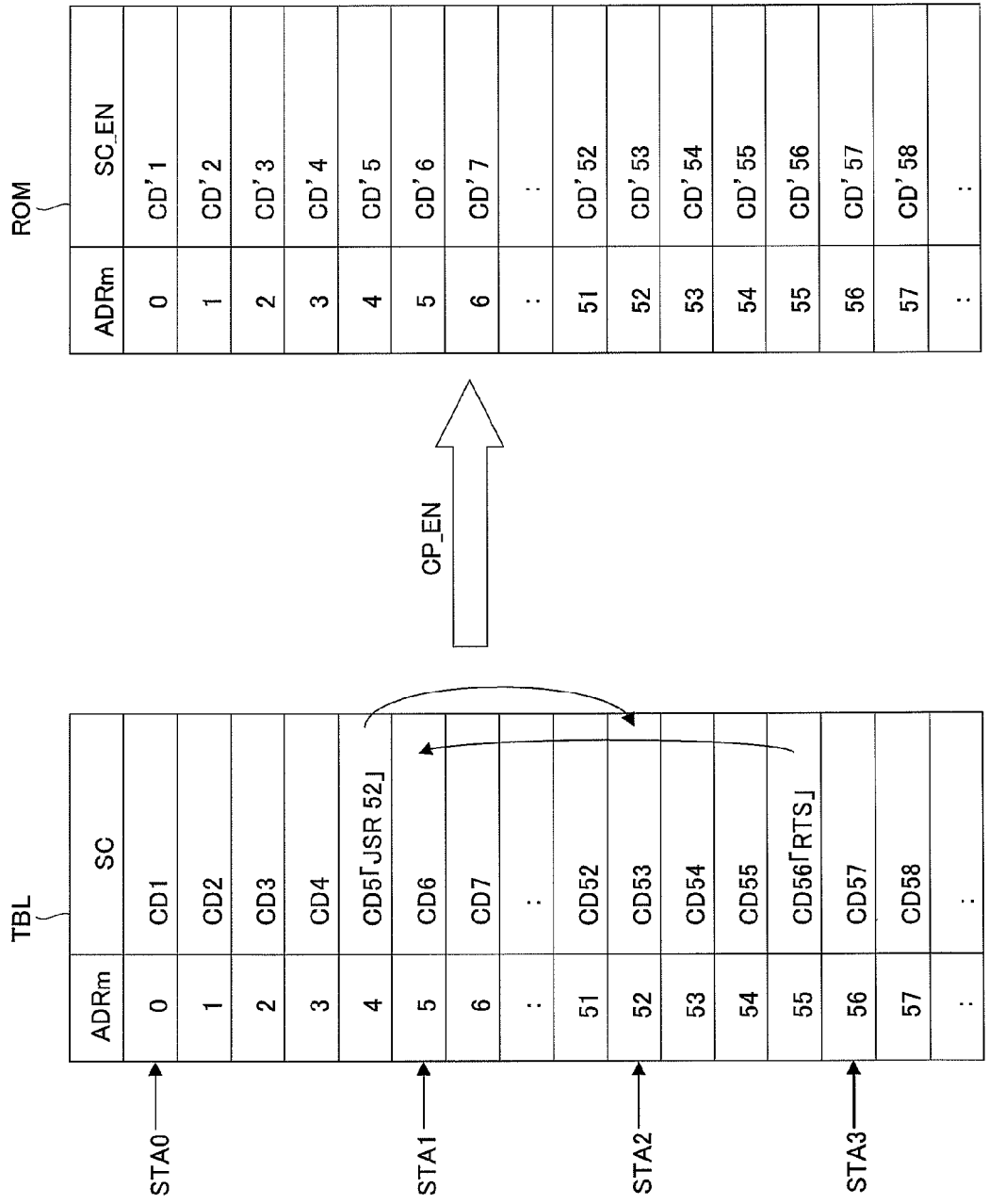
FIG. 9 is a supplementary diagram of FIG. 8.

FIG. 8 is a flow diagram showing an operation example of the encryption compiler CP_EN used when generating the encrypted code in the information processing device of FIG. 1. FIG. 9 is a supplementary diagram of FIG. 8. First, it is assumed that the values of the address signal ADRm "0 to 57, . . ." and the source codes "CD1 to CD58, . . ." sequentially assigned to the values of the ADRm are prepared in advance as the source codes SC before the encryption on the processing table TBL of the external device PC as shown in FIG. 9. The encryption compiler CP_EN performs the encryption process with using the processing table TBL as an input, thereby creating the encrypted codes "CD'1 to CD'58, . . ." for each of the values of the address signals ADRm "0 to 57, . . .".

As shown in FIG. 8, the encryption complier CP_EN first sets "j=1 and ADRm=0" (S801). Next, it is determined whether or not the source code of the ADRm is the code to be the start of the branch boundary. More specifically, it is assumed that the source code CD5 of ADRm=4 is the instruction of the unconditional branch to the subroutine of ADRm=52 and the source code CD56 of ADRm=55 is the instruction of the return from the subroutine in FIG. 9. In such a case, in addition to the CD1 to be an initial code, the CD6 of ADRm=5 which is the initial code after returning from the subroutine, the CD53 of ADRm=52 which is the initial code after the subroutine branch and the CD57 of ADRm=56 which is the initial code after the branch made in some way become the start codes (STA0 to STA3) of the branch boundary.

In FIG. 8, the CP_EN sets j=1 (S807) when the code is the start of the branch boundary, and executes the encryption operation "CDn=ADRm+CDn" corresponding to the decryption process to the EOR40 of FIG. 4 (S803) when it is not the start of the branch boundary. Subsequently, the CP_EN determines the value of j and generates the encrypted code CD'n in accordance with the value (S804). At this time, (a) when j=1 (that is, the code of the start address of the branch boundary), the first-stage encrypted code CD'n=CD'n[1] is generated by using the formula (1)'. The f1' of the formula (1)' is an inverse operation of the f1 described in FIG. 5 and it means that the EXOR operation by the KEY1 is executed after performing the nonlinear inverse transform. Furthermore, in the case of j=1, CDn−1 in the formula (1)' is the initial value IV described in FIG. 5.

$$CD'n[1]=f1'(CDn)+CDn-1 \qquad (1)'$$

Also, in S804, (b) when j=2 (that is, the code of "the start address of the branch boundary+1"), the second-stage encrypted code CD'n=CD'n[2] is generated by using the formula (2)'. The f2' of the formula (2)' is an inverse operation of the f2 described in FIG. 5 and it means that the EXOR operation by the KEY2 is executed after performing the nonlinear inverse transform. Furthermore, in the operation at this time, the CD'n[1] which is the first-stage encrypted code with respect to a target source code and the CD'n−1[1] which is the first-stage encrypted code with respect to the source code at the previous cycle thereof are used. These are given by the formula (1)'.

$$CD'n[2]=f2'(CD'n[1])+CD'n-1[1] \qquad (2)'$$

Further, in S804, (c) when j≧3 (that is, the code of "the start of the branch boundary+2" or more), the third-stage encrypted code CD'n=CD'n[3] is generated by using the formula (3)'. The f3' of the formula (3)' is an inverse operation of the f3 described in FIG. 5 and it means that the EXOR operation by the KEY3 is executed after performing the nonlinear inverse transform. Furthermore, in the operation at this time, the CD'n[2] which is the second-stage encrypted code with respect to the target source code and the CD'n−1[2] which is the second-stage encrypted code with respect to the source code at the previous cycle thereof are used. These are given by the formula (2)'. Also, the formula (1)' is used in order to execute the operation of the formula (2)'.

$$CD'n[3]=f3'(CD'n[2])+CD'n-1[2] \qquad (3)'$$

Next, the CP_EN sets "j=j+1 and ADRm=ADRm+1" in S805, and determines whether or not the ADRm is the last address in S806. When it is the last address, the decryption process ends, and when it is not so, the process returns to S802 to perform the same process for the source code of the next ADRm. Then, the encrypted source code SC_EN thus generated is stored in the ROM in the information processing device SYS of FIG. 1.

Figure 10:
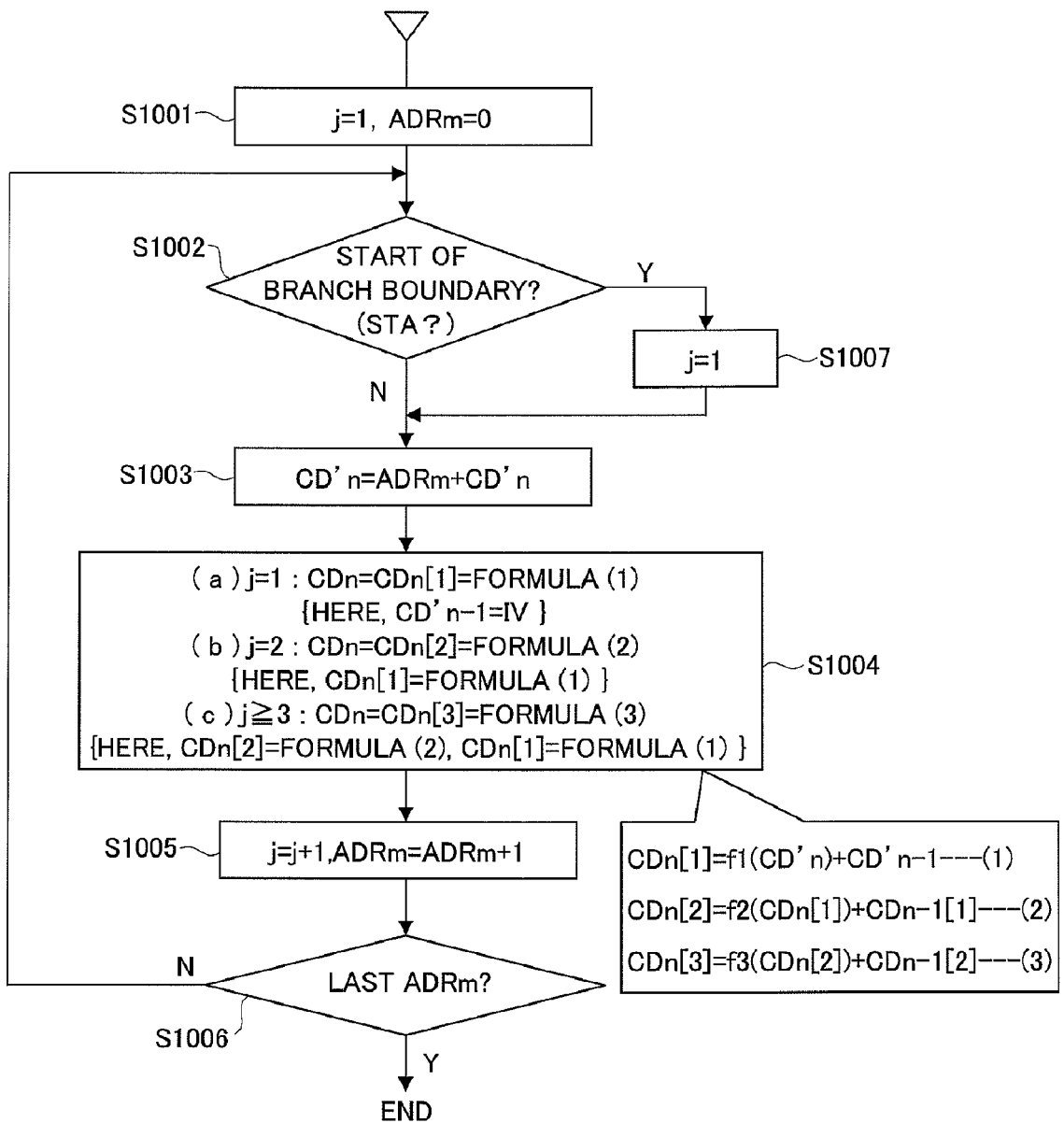
FIG. 10 is a flow diagram showing one example of the process in a decryption processing method of an encrypted instruction according to one embodiment of the present invention.

FIG. 10 is a flow diagram showing one example of the process in the decryption method of an encrypted instruction code according to one embodiment of the present invention. In the decryption method of FIG. 10, the inverse operation of the above-described encryption method of FIG. 8 is executed, and in the process flow thereof, the decryption operation described in FIG. 2 to FIG. 7 is performed by, for example, the program process using a processor. The process steps S1001 to S1007 shown in FIG. 10 are almost the same as the process steps S801 to S807 described in FIG. 8, and S1003 corresponding to S803 of FIG. 8 and S1004 corresponding to S804 of FIG. 8 only are varied.

More specifically, in S1003, upon reception of the encrypted code CD'n and its address signal ADRm, the decryption operation "CD'n=ADRm+CD'n" corresponding to the EOR40 is executed. Furthermore, in S1004, (a) when j=1, the first-stage decrypted code CDn=CDn[1] is generated by using the formula (1) described in FIG. 5. Similarly, (b) when j=2, the second-stage decrypted code CDn=CDn[2] is generated by using the formula (2), and (c) when j≧3, the third-stage decrypted code CDn=CDn[3] is generated by using the formula (3).

Note that, in FIG. 10, the process of determining the value of j (cipher strength) in accordance with the distance from the branch instruction (that is, corresponding to S1001, S1002, S1005 and S1007) is performed by the cipher strength control block CTL_BK of FIG. 6 when the information processing device of FIG. 1 is used. Further, when the process of FIG. 10 is performed by, for example, the program process, the increment of the address signal ADRm (that is, corresponding to S1005) is the process of the program counter and the like.

When the decryption process is performed by the program process as described above, although both the protection function and the execution speed are decreased as compared with the case of using the dedicated hardware like in FIG. 4, the protection function can be ensured unless the secret key KEY is deciphered. Further, also in the case of using the program process, since the decryption algorithm is such that the cipher strength is gradually increased (that is, the amount of operation is increased) from immediately after the issuance of the branch instruction like that of the case of the hardware process, the overhead immediately after the issuance of the branch instruction can be reduced, and the speed-up can be achieved.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, although the example where the decrypted codes are generated in the order of CD1[1], CD2[2], CD3[3], CD4[3], . . . by using the three-stage pipeline after the issuance of the branch instruction has been shown in the embodiment described above, various modifications can be made as long as the configuration is such that the number of process stages immediately after the issuance of the branch instruction is small and the number of process stages is gradually increased each time when passing through the instruction execution cycle. For example, it is also possible to output the decrypted codes in the order of CD1[2], CD2[3], CD3[4], CD4[4], . . . by using a four-stage pipeline and outputting the codes from the second-stage pipeline after the issuance of the branch instruction. Furthermore, it is also possible to output the decrypted codes in the order of CD1[1], CD2[3], CD3[5], CD4[5], . . . by using a five-stage pipeline and increasing the number of process stages by two stages at a time after the issuance of the branch instruction.

The information processing device according to one embodiment of the present invention is the technology particularly effective when applied to an embedded device for performing the desired hardware control by using the firmware stored in a ROM, and other than that, it can be widely applied to all the information processing devices in which the security is required.

What is claimed is:

1. An information processing device, comprising:

a memory in which an encrypted code is stored;

a decryptor which performs, to the encrypted code, a multiple-stage decryption process including a first stage and a second stage performed after decryption through the first stage, and which sets a k-th stage which is any one stage of the multiple stages, thereby outputting a decrypted code having passed through a k-stage decryption process; and an instruction execution unit for executing the decrypted code, wherein, when the instruction execution unit issues a branch instruction in a course of an execution cycle of the decrypted code, the decryptor sets a small value to "k" of the k-th stage with respect to the encrypted code of a branch destination, and thereafter, the decryptor outputs the decrypted code while changing the value of "k" to a larger value each time when the execution cycle of the instruction execution unit advances, the decryptor includes:

a decryption processing circuit which has a multiple-stage pipeline and performs a decryption process using a key for each stage of the multiple-stage pipeline upon reception of the encrypted code;

a selection circuit which selects any one output from outputs of each stage of the multiple-stage pipeline in accordance with a select signal and outputs the selected output to the instruction execution unit; and a control circuit for generating the select signal while detecting issuance of the branch instruction by the instruction execution unit, the decryption processing circuit includes:

a first node to which the encrypted code is transmitted;

a first-stage pipeline provided between the first node and a second node; and a second-stage pipeline provided between the second node and a third node, the first-stage pipeline includes:

a first EXOR circuit which executes an exclusive OR operation using the first node and a first key as inputs;

a first transform circuit which performs a nonlinear transform of an output of the first EXOR circuit;

a first register which delays a signal of the first node by a predetermined number of cycles; and a second EXOR circuit which executes an exclusive OR operation using an output of the first transform circuit and an output of the first register as inputs, and outputs an operation result of the second EXOR circuit to the second node, and the second-stage pipeline includes:

a third EXOR circuit which executes an exclusive OR operation using the second node and a second key as inputs;

a second transform circuit which performs a nonlinear transform of an output of the third EXOR circuit;

a second register which delays a signal of the second node by a predetermined number of cycles; and a fourth EXOR circuit which executes an exclusive OR operation using an output of the second transform circuit and an output of the second register as inputs, and outputs an operation result of the fourth EXOR circuit to the third node.

2. The information processing device according to claim 1, wherein the control circuit includes:
a counter circuit;
a select signal generating circuit which outputs the select signal in accordance with a count value of the counter circuit; and
a first signal generating circuit which notifies a cycle of outputting the decrypted code to the instruction execution unit by outputting a first signal in accordance with the count value of the counter circuit, and
the counter circuit performs a count operation each time when a cycle of receiving the encrypted code from the memory is generated, and initializes the count value when the counter circuit detects that the instruction execution unit issues the branch instruction.

3. The information processing device according to claim 1, wherein keys for each stage of the multiple-stage pipeline are different from each other.

4. A decryption method of an encrypted instruction code, in which decrypted instruction codes are sequentially generated while sequentially transforming encrypted instruction codes inputted at each cycle by using a decryptor circuit,
wherein the decryptor circuit performs:
a first process of determining whether or not the encrypted instruction code inputted at each cycle is a branch instruction;
a second process of, when the encrypted instruction code is the branch instruction in the first process, performing a first decryption process to a first encrypted instruction code inputted at a first cycle subsequent to a cycle at which the encrypted instruction code is inputted, thereby generating a first decrypted instruction code; and
a third process of performing a second decryption process having a cipher strength higher than a cipher strength of the first decryption process to a second encrypted instruction code inputted at a second cycle subsequent to the first cycle, thereby generating a second decrypted instruction code,
the first decryption process includes:
a first EXOR process in which an exclusive OR operation of the first encrypted instruction code and a first key is executed;
a first transform process in which a nonlinear transform of an operation result of the first EXOR process is performed with a first transformation rule; and
a second EXOR process in which an exclusive OR operation of a transform result of the first transform process and a predetermined initial value is executed and this operation result is output as the first decrypted instruction code, and
the second decryption process includes:
a third EXOR process in which an exclusive OR operation of the second encrypted instruction code and the first key is executed;
a second transform process in which a nonlinear transform of an operation result of the third EXOR process is performed with the first transformation rule;
a fourth EXOR process in which an exclusive OR operation of a transform result of the second transform process and the first encrypted instruction code is executed;
a fifth EXOR process in which an exclusive OR operation of an operation result of the fourth EXOR process and a second key is executed;
a third transform process in which a nonlinear transform of an operation result of the fifth EXOR process is performed with a second transformation rule; and
a sixth EXOR process in which an exclusive OR operation of a transform result of the third transform process and the first decrypted instruction code is executed and an operation result of the sixth EXOR process is output as the second decrypted instruction code.

5. An encryption method of an instruction code in which a source instruction code prepared in advance is transformed by using a program process by a computer system, thereby generating an encrypted instruction code,
wherein the computer system performs:
a first step of determining whether or not each of a plurality of source instruction codes assigned to a plurality of addresses is a branch instruction, and when it is determined that one of the plurality of source instruction codes is a branch instruction, recognizing a first address to be a branch destination and a first source instruction code assigned to the first address;
a second step of transforming the first source instruction code by using a first encryption algorithm, thereby generating a first encrypted instruction code; and
a third step of transforming a second source instruction code assigned to a second address executed next to the first address by using a second encryption algorithm having a cipher strength higher than that of the first encryption algorithm, thereby generating a second encrypted instruction code,
the first encryption algorithm includes:
a first transform process in which a nonlinear transform of the first source instruction code is performed with a first transformation rule;
a first EXOR process in which an exclusive OR operation of a transform result of the first transform process and a first key is executed; and
a second EXOR process in which an exclusive OR operation of an operation result of the first EXOR process and a predetermined initial value is executed and this operation result is output as the first encrypted instruction code, and
the second encryption algorithm includes:
a second transform process in which a nonlinear transform of the second source instruction code is performed with the first transformation rule;
a third EXOR process in which an exclusive OR operation of a transform result of the second transform process and the first key is executed;
a fourth EXOR process in which an exclusive OR operation of an operation result of the third EXOR process and the first source instruction code is executed;
a third transform process in which a nonlinear transform of an operation result of the fourth EXOR process is performed with a second transformation rule;
a fifth EXOR process in which an exclusive OR operation of a transform result of the third transform process and a second key is executed; and
a sixth EXOR process in which an exclusive OR operation of an operation result of the fifth EXOR process and the first encrypted instruction code is executed and this an operation result of the sixth EXOR process is output as the second encrypted instruction code.

* * * * *